US008769399B2

(12) United States Patent
Marantz et al.

(10) Patent No.: US 8,769,399 B2
(45) Date of Patent: Jul. 1, 2014

(54) AIDING SEARCH-RESULT SELECTION USING VISUALLY BRANDED ELEMENTS

(75) Inventors: Daniel Marantz, Redmond, WA (US); Alec John Berntson, Seattle, WA (US); Darwin Kengo Yamamoto, New York, NY (US); Christina Marie Koehn, Seattle, WA (US); Steve Ballon, Issaquah, WA (US); Keith Alan Regier, Kirkland, WA (US); Brian Macdonald, Bellevue, WA (US); Steven Tullis, Redmond, WA (US); Steven Macbeth, Redmond, WA (US); Rodney Coleman Edwards, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/170,789

(22) Filed: Jun. 28, 2011

(65) Prior Publication Data

US 2013/0007587 A1  Jan. 3, 2013

(51) Int. Cl.
G06F 17/00 (2006.01)
G06F 17/30 (2006.01)

(52) U.S. Cl.
USPC .......... 715/234; 715/201; 715/741; 715/762; 707/770; 707/783

(58) Field of Classification Search
None
See application file for complete search history.

(56) References Cited

U.S. PATENT DOCUMENTS

| 6,711,567 | B2 | 3/2004 | Littlefield et al. |
| 7,065,520 | B2 | 6/2006 | Langford |
| 7,359,893 | B2 | 4/2008 | Sadri et al. |
| 7,844,591 | B1 | 11/2010 | Lettau et al. |
| 2005/0154718 | A1* | 7/2005 | Payne et al. ............ 707/3 |

(Continued)

OTHER PUBLICATIONS

Xue, et al., "Improve Web Search Using Image Snippets", In AAAI'06 proceedings of the 21st national conference on Artificial intelligence, 2006, 6 Pages, vol. 2.

(Continued)

Primary Examiner — Maikhanh Nguyen
(74) Attorney, Agent, or Firm — Dave Ream; Leonard Smith; Micky Minhas

(57) ABSTRACT

Computer-storage media, methods, and systems for formatting and surfacing a badge are provided. The badge represents a graphical region presented in visual association with a search result on a web-results page. The format of the badge is initially dictated by a template that is automatically generated. Upon collecting performance information, a website owner is granted permission to alter the template and appearance of the badge, via a publisher portal. During interaction with the publisher portal, the website owner is prompted to provide feedback in order to manage parameters of the badge, such as uploading a visual representation of a logo, trademark, or other branded element, or specifying a type of metadata to be imported to the graphical region. Accordingly, the badge operates to improve a users' ability to distinguish between search results on the web-results page and assists users in confidently deciding upon and selecting a relevant search result.

13 Claims, 17 Drawing Sheets

(56) References Cited

U.S. PATENT DOCUMENTS

| | | | |
|---|---|---|---|
| 2006/0224997 A1 | 10/2006 | Wong et al. | |
| 2007/0162424 A1* | 7/2007 | Jeh et al. | 707/2 |
| 2007/0276810 A1* | 11/2007 | Rosen | 707/3 |
| 2008/0235608 A1* | 9/2008 | Prabhu | 715/765 |
| 2008/0244428 A1* | 10/2008 | Fain | 715/764 |
| 2008/0313173 A1 | 12/2008 | Popper | |
| 2009/0077056 A1* | 3/2009 | Ravikumar et al. | 707/5 |
| 2009/0327268 A1* | 12/2009 | Denney et al. | 707/5 |
| 2010/0114925 A1* | 5/2010 | Shafer et al. | 707/759 |
| 2010/0115396 A1* | 5/2010 | Byron et al. | 715/234 |
| 2010/0153384 A1* | 6/2010 | van Zwol | 707/726 |
| 2011/0010352 A1* | 1/2011 | Jockisch et al. | 707/706 |
| 2011/0307482 A1* | 12/2011 | Radlinski et al. | 707/731 |

OTHER PUBLICATIONS

Goel, et al., "Introducing Rich Snippets", Retrieved on: Mar. 18, 2011, Available at: http://googlewebmastercentral.blogspot.com/2009/05/introducing-rich-snippets.html.

"WOT", Retrieved on: Mar. 18, 2011, Available at: https://chrome.google.com/extensions/detail/bhmmomiinigofkjcapegjjndpbikblnp.

* cited by examiner

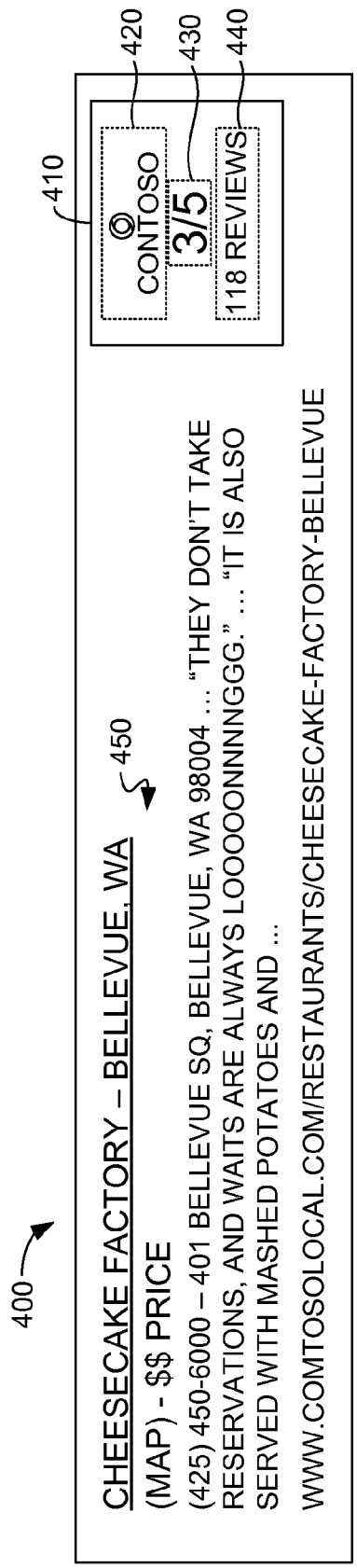
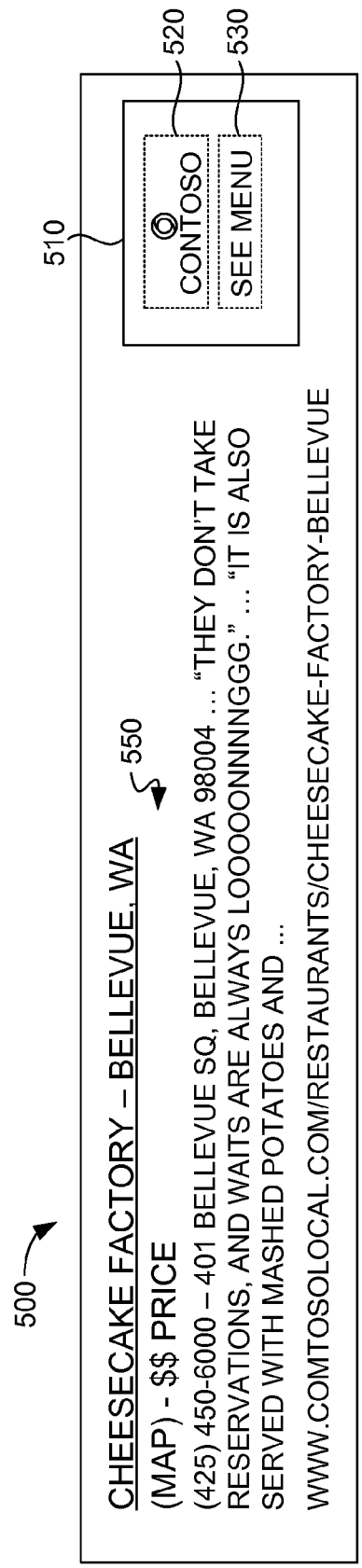
FIG. 4.
FIG. 5.

AIDING SEARCH-RESULT SELECTION USING VISUALLY BRANDED ELEMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, the Internet provides a vast variety of utilities that assist Internet searching for information. Typically, this information is delivered from a search engine to a web browser located on a user's computing device in the form of search results. These "search results" are often similarly formatted within a web-results page, thus, obscuring those members of the search results that may by more useful or relevant than others. For example, conventional search engines surface the search results as a number of blue links describing their respective online documents. These commonly situated blue links force users to actively scan for familiar terms and authoritative indicators within the search results to provide confidence prior to selection.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-storage media for improving the ability of a user to distinguish between search results in a web-results page. In one instance, the particular search results are distinguished because they are decorated with a badge. As used herein, the term "badge" is not meant to be limited to any particular visual characteristics or attributes drawn from a web page, but may encompass any attributes pulled from a source (e.g., metadata extracted from an online document), material submitted by a publisher (e.g., uploaded logo for use as a branded element), or any other data that may be incorporated into a graphical region. For example, a badge may provide a concise visual representation, or lens, that is reflective of an underlying web page's content and company logo.

In other embodiments, a self-service, publisher-portal component is established that allows site owners and other content providers to select metadata to be displayed alongside their search result (e.g., providing a feedback loop with a site owner for a certain search result in order to control parameters for the display and maintenance of the logo and metadata). This selected metadata and the logo, or branded element, are both incorporated within the graphical region of the badge. As such, the badge assists users in quickly and easily differentiating between those search results that include a badge and the balance of the similarly situated links on the web-results page. In other words, the badges provide a visual guide, or sign post, that helps users scan the search results faster in order to quickly identify meaningful links. As a result, the users are enabled to confidently select the search results decorated with badges, which indicate providers the users recognize (e.g., improves the users' ability to key in on visual patterns for well-known and trusted branded marks).

Although not offered by conventional search engines, some web-browser plug-ins attempt to reveal a small graphic (16 pixel×16 pixel), or "fav icon," representing a marking of each search result. This "fav icon" is provided by the website itself, via the plug-in, and is exposed on or near the associated web result. Further, the "fav icon" has various limitations, such as the following: the small graphic is too diminutive to be easily recognized (e.g., the "O" of the Overstock™ website is indistinguishable, and frequently confused with, the "O" representing a web location having to do with Oprah Winfrey); the plug-in is a third-party program that requires separate installation; the small graphic fails to include key aspects of the search results that aid in decision making; and the plug-in does not offer a feedback loop that allows publishers to amend the composition and appearance of the small graphic.

In contrast, the badge of the present invention is allocated a greater amount of canvas space within a web-results page (e.g., 80 pixel×50 pixel), thus, allowing the badge to accommodate various forms of information, such as metadata from an online document, a publicly recognizable branded element (i.e., element of a larger size than the "fav icons," thus, solving the recognition problem), a labeled control button for user interaction, and other visual depictions of relevant data to draw the focus of a user. Further, the badge is configurable via an interface (e.g., publisher portal) that allows publishers to monitor performance and update parameters of the badge. Even further, the badge is developed by a searching service and surfaced according to a scheme managed by the searching service, thus, providing a comprehensive and consistent format for all web-results pages with no ad-hoc programs to install.

BRIEF DESCRIPTION OF THE DRAWINGS

The present invention is described in detail below with reference to the attached drawing figures, wherein:

FIG. 4 is a schematic diagram depicting a first illustrative search result that includes a representation of an exemplary badge surfaced concurrently with the search result, in accordance with embodiments of the invention;

FIG. 5 is a schematic diagram depicting a second illustrative search result that includes a representation of an exemplary badge surfaced concurrently with the search result, in accordance with embodiments of the invention;

DETAILED DESCRIPTION

Figure 1:
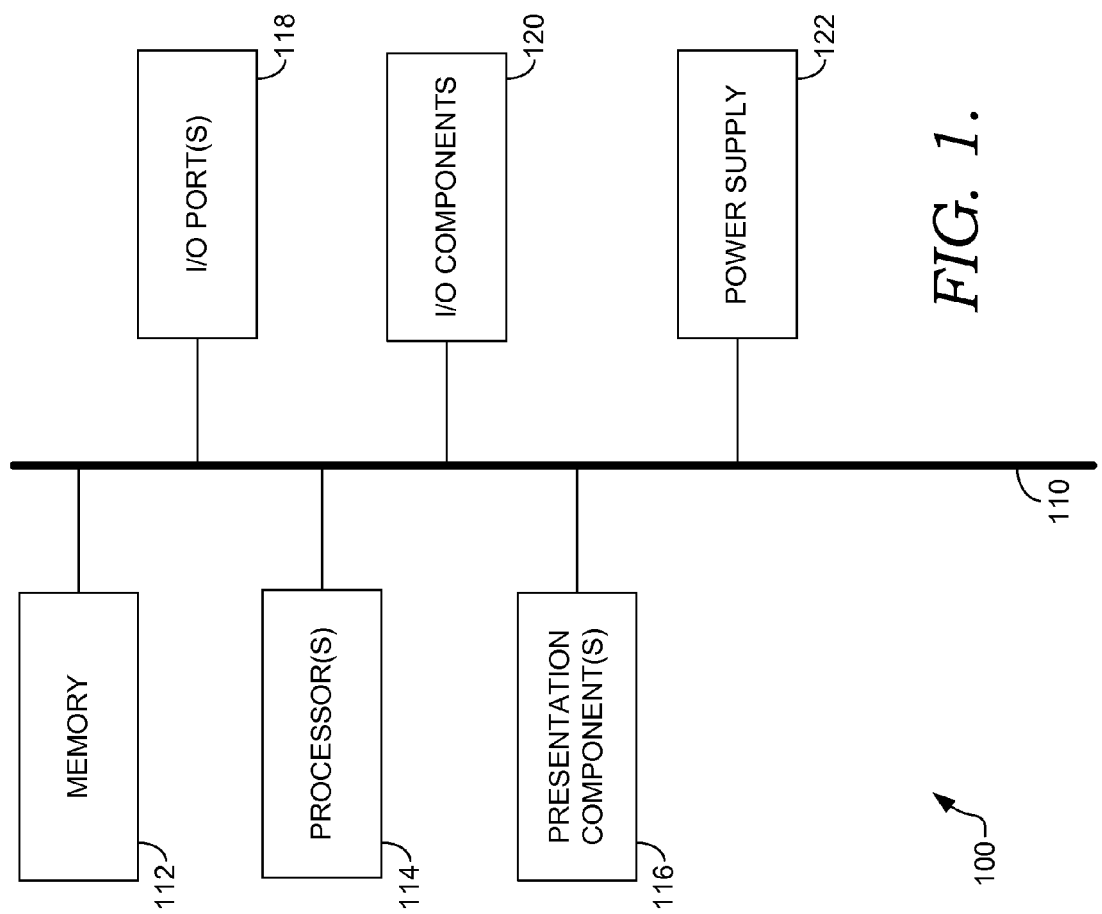
FIG. 1 is a block diagram of an exemplary computing environment suitable for use in implementing embodiments of the present invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally, embodiments of the present invention pertain to employing a search engine to produce search results that are responsive to a query, where some of the search results include a badge associated therewith. As discussed above, the term "badge" generally refers to a graphical region, or tile image, that is presented in proximity or integrated with a search result. Advantageously, the badge improves the ability of a user to distinguish between search results by highlighting or drawing the user's focus to a certain search results within a web-results page. In an exemplary embodiment, the badge improves the ability of a user to distinguish between search results by visually branding a search result using a logo and/or metadata from an underlying online document (e.g., web site or webpage). Exposing the visual brand assists the user in selecting a particular search result by leveraging the visual brand to enhance a user's confidence that the particular search result decorated with the badge is an authoritative source.

Further, embodiments of the present invention relate to formatting search result(s) that are surfaced within a display area on a graphical user interface (GUI). More particularly, an improved computerized system that generates badges for incorporation into respective search results, which are typically populated in a web-results page of the GUI, and that facilitates publisher-initiated modification of the badges is provided. Advantageously, these novel badges improve the users' ability to distinguish between the search results and to aid in targeting one or more of the search results based on confidence built in by information delivered by the badge (e.g., by leveraging a visual branded element of authoritative sites alongside an authorized search result and by exposing key aspects drawn from the underlying online document).

In operation, when a request for an online search is made (e.g., entry of a query to a searching service), one or more of the search results may be decorated with a badge that is generated or retrieved upon selecting the search results that satisfy the request. The badge, as more fully discussed below, may include a branded element (e.g., logo, trademark, or image affiliated with an entity operating the website), content drawn from predefined metadata fields in an online document (e.g., ratings of a website's service or goods), and/or any other information (e.g., link to related web page) that is relevant to the user's pursuit of a search result that best meets their searching intent.

Unfortunately, the conventional search engines fail to surface badges or branded elements, either explicitly or implicitly. To address this deficiency of conventional search engines, exemplary embodiments of the present invention include configuring search engines to return and surface badges that are relevant to certain search results. As a result, providing these badges as in tandem with the search results will potentially help users to complete their tasks faster and with better accuracy. As can be gleaned from the disclosure above, various embodiments of the present invention involve employing a mapping between badges and search results. Often, the search results are generated and surfaced on a graphical user-interface (GUI) display through the employment of task-based engines (e.g., decision engines, task engines, individual applications or operations, applet systems, operating systems, and task-based mobile systems), or general systems that allow a user to accomplish tasks by matching apps to user intent. For simplicity of discussion, these engines and/or systems will be hereinafter referred to as "search engines" or "search-engine components."

Accordingly, in one aspect, the present invention provides one or more computer-storage media having computer-executable instructions embodied thereon that, when executed, perform a method for formatting a badge according to a template, where the badge is associated with at least one search result selected for display on a graphical user interface (GUI). Initially, the method involves providing a plurality of metadata extracted from one or more online documents. In addition, a template that is previously assigned to the badge is accessed. Typically, the badge represents a graphical region that is revealed in association with a search result, while the search result includes a brief description (e.g., summary of content, link, title, matching terms, and the like) of the online document(s).

The method may further involve the steps of selecting one or more metadata from the plurality of extracted metadata as specified by the template and constructing the badge by incorporating the selected metadata into the badge. In an exemplary embodiment, the step of incorporating comprises inserting visual depictions of the selected metadata, as well as other data (e.g., branded element, control button, label, and the like), within the visual confinements of the badge. When displaying the web-results page, the search result may be rendered within the GUI by incorporating the badge within its description of the online document(s) that are referenced by the search result. In instances, the step of incorporating involves integrating the badge within the search-result description or arranging the badge in proximity with the search result such that they are visually associated with one another.

In another aspect, a computerized method is provided for focusing a user's attention on a subject search result by rendering a badge therein or therewith. In embodiments, the method includes the steps of recognizing that the subject search result is retrieved for presentation on a web-result page and identifying a template that is associated with the subject search result. Typically, the associated template is selected, via a partner-interaction process, by a publisher of an online document. Often, the online document is the web page or website that is being referenced by the subject search result.

The method may further involve formatting the badge based on the template. Generally, the badge represents a graphical region that includes a brand element and/or metadata extracted from the online document as dictated by the template. When rendering the web-results page, the badge may be visually associated with the subject search result by initiating a display of the badge in physical proximity with the subject search result. Further, upon viewing the badge, the publisher may invoke the partner-interaction process to alter the appearance of the badge, as more fully discussed below.

In yet another embodiment of the present invention, a computer system is provided for establishing a badge that is visually associated with a search result on a web-result page and for hosting an interface that permits alteration of the badge. By way of system architecture, the computer system comprises a processing unit coupled to a computer storage medium that stores a plurality of computer software components executable by the processing unit. The computer software components may include a search-engine component, a publisher-portal component, and a badge-composer component.

Initially, the search-engine component is configured for crawling a web index to retrieve a plurality of web results. Typically, the web results include a search result preauthorized to include a badge. As mentioned above, the term "badge" broadly represents a visual icon structured with a template that holds a branded element and/or metadata extracted from an online document referenced by the preauthorized search result. The publisher-portal component is configured to prompt a publisher of the online document to upload a logo for use as the branded element and to indicate a type of the extracted metadata to be populated into the template. In embodiments, the type of the extracted metadata may include one or more of the following: rating information, ranking information, number-of-visit information, or any other customer-reviews of the publisher's goods or services being marketed through the online document.

The badge-composer component is configured to automatically construct the badge using configuration data when initially establishing a presence of the badge. The configuration data, as described more fully below, is data automatically assembled to form the initial elements of the badge's graphical region. Upon a publisher making amendments to the graphical region, the badge may be modified by replacing the configuration data with solicited data and extracted data. The solicited data may involve information requested by the publisher-portal component, such as a logo or link to upload, while the extracted data involves the publisher indicating a type of metadata through the publisher-portal component that is intended for extraction from an online document. Further, the badge-composer component may be configured for rendering the badge on a web-results page. In an exemplary embodiment, rendering may include crawling the online document to extract the metadata as dictated by the indicated type of metadata. During the lifespan of the badge, the extracted metadata input within the badge's graphical region may be dynamically updatable based, in part, upon changes to the online document.

As discussed herein, the "templates" include instructions on how to format a layout of a badge, among other things. In an exemplary embodiment, the template establishes content panes or areas on the layout that are configured to accept various data, respectively. Typically, the content panes are configured as placeholders for metadata, images, logos, or any other content that may be presented on the GUI. In one instance, the content panes are rectangles that are adapted to be populated with metadata derived from one or more online documents targeted by the template. In still other embodiments, the adaptive template performs a routine that determines the number, size, and position of the content panes based on the configuration data, solicited data, and/or extracted data that is determined to be revealed by the badge.

Having briefly described an overview of embodiments of the present invention and some of the elements featured therein, an exemplary operating environment suitable for implementing the present invention is described below.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
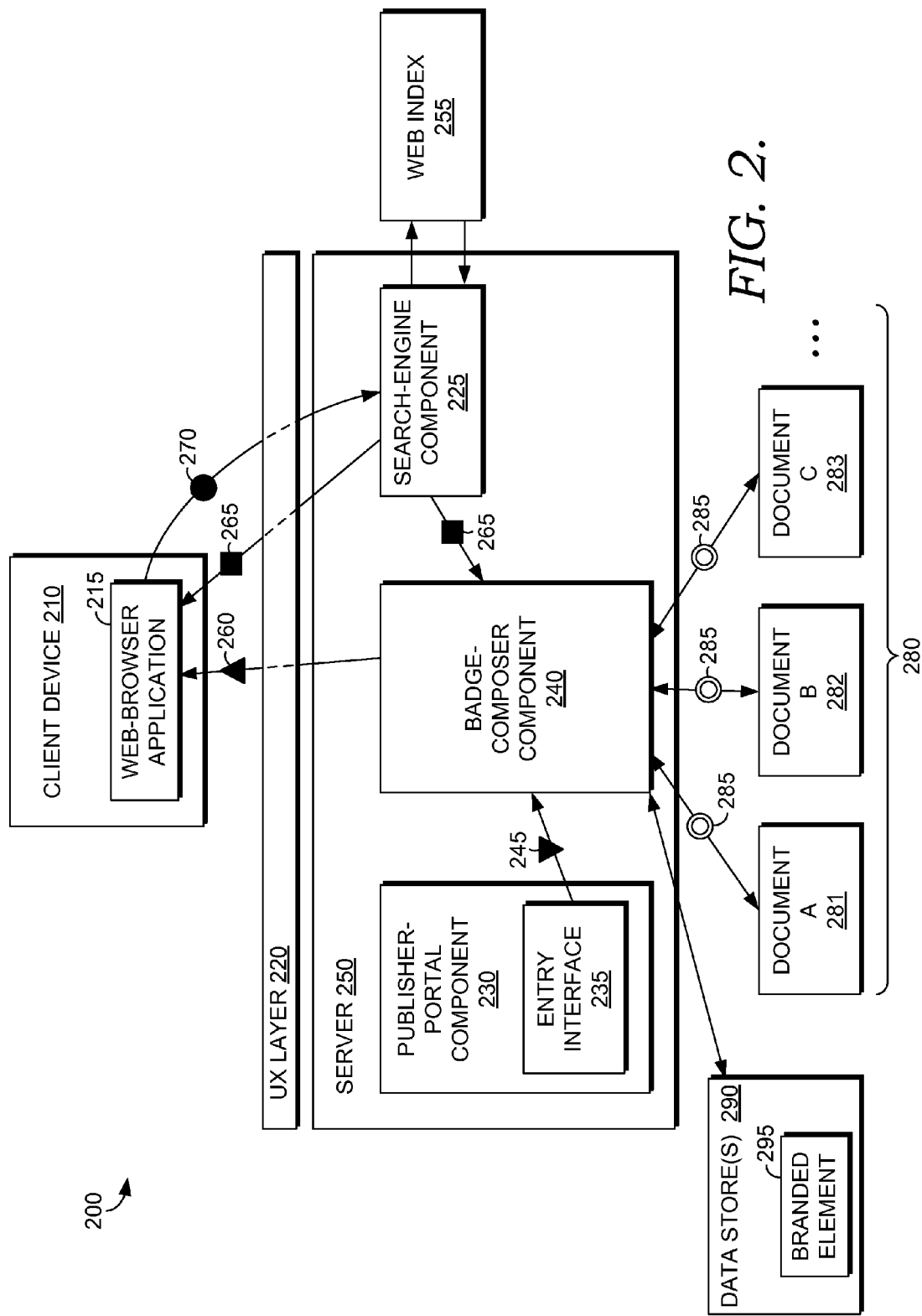
FIG. 2 is a schematic diagram of an exemplary system architecture suitable for use in implementing embodiments of the present invention, in accordance with an embodiment of the present invention.

Technology introduced by embodiments of the present invention for automatically generating badges relevant to one or more search results, altering the appearance of the badges based on publisher feedback (e.g., upon the publisher monitoring performance of the badges and updating the badge's graphical region based on the monitored performance), and surfacing on a GUI display representation(s) of the altered badges as part of the search results will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to systems and methods for improving a users' ability to distinguish between search results on a web-results page and assisting users in confidently deciding upon and selecting a relevant search result (i.e., satisfying the user's searching intent) by leveraging a branded element (e.g., visual representation of a logo or trademark) of authoritative websites alongside the search result and/or by exposing metadata extracted from the website. It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes a client device 210, a user experience (UX) layer 220, a server 250, online documents 280, data store(s) 290, and a network (not shown) that interconnects each of these items. Each of the client device 210, the data store(s) 290, and the server 250 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., search-engine component 225, publisher-portal component 230, badge-composer component 240, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 290 to retrieve a branded element or parsing the marked-up online documents 280 for metadata). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following software components or modules: the search-engine component 225 that interfaces with a web index 255, the publisher-portal component 230, and the badge-composer component 240.

The client device 210 may include an input device (not shown) and a presentation device (not shown). Generally, the input device is provided to receive input(s) affecting, among other things, a presentation of the search results in a browser window surfaced at a GUI display area. Illustrative devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool (e.g., mouse pointer) hovering over the search results and badges that are responsive to the query.

In embodiments, the presentation device is configured to render and/or present the GUI display thereon. The presentation device, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device is configured to present rich content, such as the browser window that includes a display area populated with search results (e.g., descriptions of online documents and tile images). In another exemplary embodiment, the presentation device is capable of rendering other forms of media (e.g., audio signals). In yet another exemplary embodiment, the presentation device may present a portion of the search results (e.g., descriptions of and links to websites) in proximity with representations of badges, as more fully discussed below.

Figure 9:
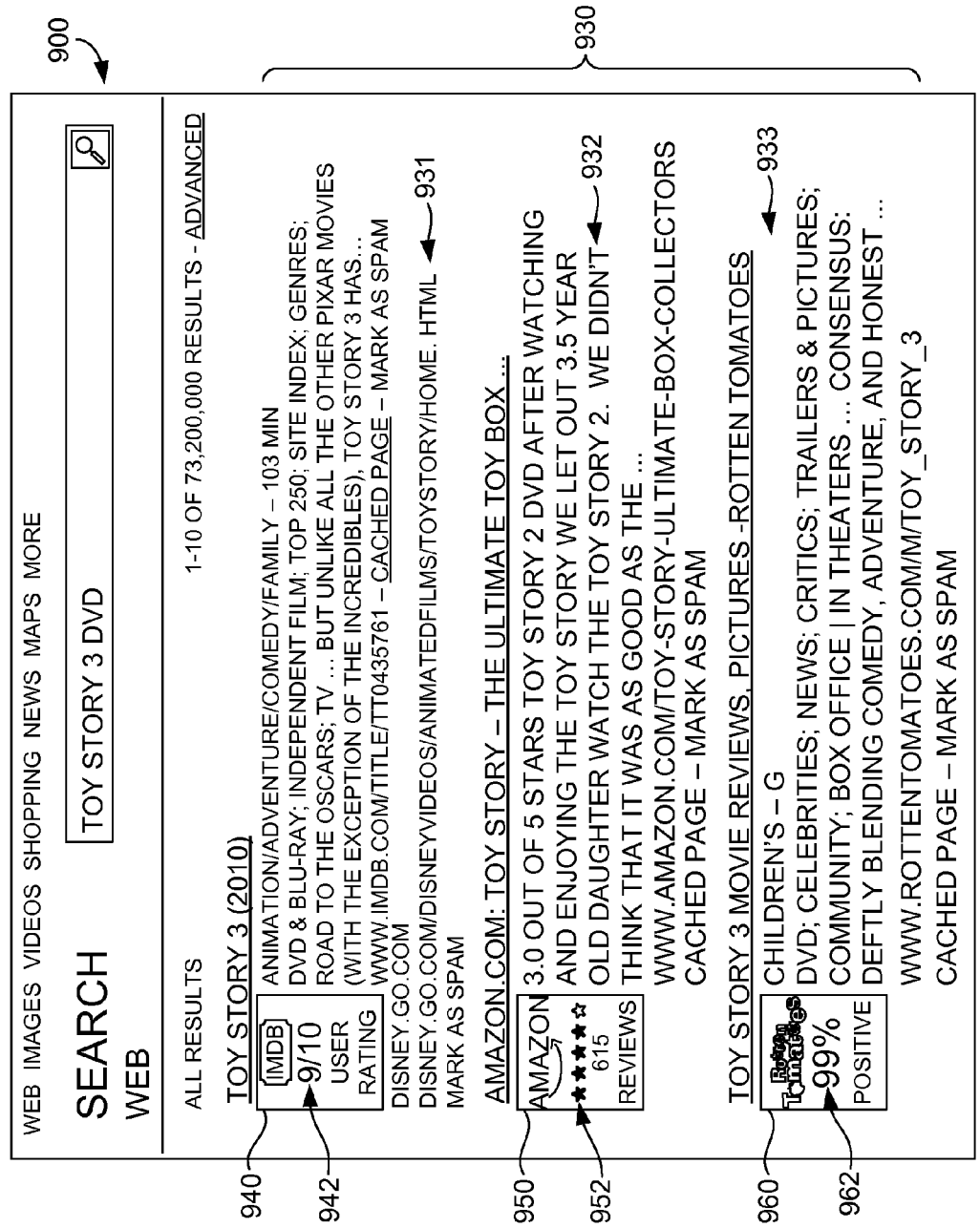
FIG. 9 is a schematic diagram depicting a third illustrative UI display that includes representations of badges surfaced in association with respective search results, in accordance with embodiments of the invention.

The data store(s) 290 are generally configured to store information to support generation of a badge, such as a branded element 295. As discussed above, the phrase "branded element" is not meant to be limited to the embodiments described herein, but may encompass any form of image, icon, trademark, graphic, animation, text, symbol, letter or number, audio signal, or visual that allows a user to recognize a source (e.g., company, organization, firm, individual, partnership, or other entity) that is attached in some fashion to a search result. For instance, the branded element IMDb™ for the Internet Movie Database may appear within the layout of a badge that decorates a search result for Disney™ videos, as shown in FIG. 9. In various embodiments, the information stored in the data store(s) 290 may also include, without limitation, metadata extracted from the online documents 280, configuration data used to automatically set up the initial version of the badge, a user profile that stores parameters of a template assigned to a publisher, visual depictions of data that are populated within a layout of the badge, and any other information that pertains to embodiments of the present invention.

In addition, the data store(s) 290 may be configured to be searchable for suitable access of the stored information. For instance, the data store(s) 290 may be searchable for one or more branded elements 295 or extracted metadata. It will be understood and appreciated by those of ordinary skill in the art that the information stored in the data store(s) 290 may be configurable and may include any information relevant to the execution of the badge-composer component 240. The content and volume of such information are not intended to limit the scope of embodiments of the present invention in any way. Further, though illustrated as single, independent components, the data store(s) 290 may, in fact, be a plurality of databases, for instance, a database cluster, portions of which may reside on the client device 210, the server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the client device 210, the data store(s) 290, the server 250, the UX layer 220, and components 225, 230, and 240, as illustrated. In some embodiments, one or more of the components 225, 230, and 240 may be implemented as stand-alone devices. In other embodiments, one or more of the components 225, 230, and 240 may be integrated directly into the server 250, or on distributed nodes that interconnect to form the server 250. It will be understood by those of ordinary skill in the art that the components 225, 230, and 240 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one entry interface 235 is shown, many more may be communicatively coupled via the entry interface 235).

Further, the devices of the exemplary system architecture may be interconnected by any method known in the relevant field. For instance, the server 250 and the client device 210 may be operably coupled via a distributed computing environment that includes multiple computing devices coupled with one another via one or more networks. In embodiments, the network may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 225, 230, and 240 are designed to perform a process that determines whether a search result 265 warrants the inclusion of a badge 260, generation of the badge 260, and soliciting customization of the badge's template or parameters within predefined constraints. Initially, the search-engine component 225 is configured for crawling a web index 255 to retrieve a plurality of search results 265. In embodiments, the web-browser application 215 is generally configured to access and communicate with the search-engine component 225 running on the server 250. In one instance, access to the search-engine component 225 is attained by providing an appropriate uniform resource locator (URL) address to the web-browser application 215 that targets the search-engine component 225. In another instance, communication may be via an Internet (e.g., the World Wide Web) or an intranet (e.g., internal system to the communications network). Accordingly, the web-browser application 215 may be configured to convey the query 270 to the search-engine component 225 and receive search results 265 in return.

In an exemplary embodiment, the search-engine component 225 is responsible for receiving the query 270 from a web-browser application 215 running on the client device 210, generating search results 265 that are responsive to the query 270, delivering the search results 265 to the badge-composer component 240 to determine whether any of the search results 265 are preauthorized and/or approved for having a badge 260 presented therewith, and sending the search results 265 that are preauthorized for assuming the badge 260 through the UX layer 220 for rendering on the web-results page at the web-browser application 215.

The publisher-portal component 230, as more fully discussed below, is configured to employ the entry interface 235 (see FIGS. 10-16) to prompt a publisher of the online documents 280 (e.g., documents A 281, B 282, and C 283) to upload a logo or trademark (represented by reference numeral 245) for use as the branded element 295. Further, the publisher-portal component 230 functions to indicate a type of the extracted metadata to be populated into the layout of the badge 260, thereby governing the appearance of the badge 260. In embodiments, the type of the extracted metadata (represented by reference numeral 285) may include rating information (see reference numeral 862 of FIG. 8), ranking information, number-of-visit information (see reference numeral 863 of FIG. 8), or any other customer-reviews of the publisher's goods or services being advertised or disseminated through the online documents 280.

The badge-composer component 240 is configured to automatically construct an initial version of the badge 260 using configuration data when initially establishing a presence of the badge 260. The phrase "configuration data" generally refers to data automatically assembled to form the initial elements of the badge's graphical region. Typically, the type of quality of the configuration data retrieved to form the badge is dictated by a default template assigned by the system to the publisher. By way of example, the configuration data may include a logo that describes some aspect of the publisher, labels on the badge, background colors, fonts, initial metadata pulled from the online documents 280, static data (e.g., stored in a separate data store 290), an audio file, an animation sequence, link(s) to website(s), or any other information or tools that may be recovered and employed by the badge-composer component 240.

Although various different examples of the configuration data have been described, it should be understood and appreciated that other types of suitable articles of information or images that provide insight to the relevance, value, or identity of the decorated search result may be used, and that embodiments of the present invention are not limited to the exemplary configuration data described herein. For instance, the configuration data may include, in part or in full, data submitted by the publisher that assists in composing the graphical region of the badge.

Upon using the configuration data to generate an initial version of the badge 260, the badge 260 is then tested to preauthorize the corresponding search result or website for being awarded the badge 260. In embodiments, websites that meet a bar of authority are enabled for being granted the distinction of having badge-decorated search results. This preauthorization testing, or "fighting," is carried out by the badge-composer component 240. Generally, the process of fighting involves exposing a small pool of users (e.g., randomly rendering the badge to 2% of a total population of users) to the initial version of the badge and measuring their reactions to and/or interactions with the badge. Based on the context surrounding the subject matter of the badge and/or the website underlying the search result being flighted, the fighting process may comprise a regional, national, or international review.

Upon measuring the user's reaction and/or interaction with the initial version of the badge 260, the fighting process continues with collecting and evaluating usage statistics that expose the users' opinion of the utility of the badge 260. In one instance of evaluation, these user statistics are compared against a predefined grading system in order to assign a level of satisfaction with badge 260, where the level of satisfaction is determinative of whether the badge 260 is preauthorized for presentation. By way of example, if the level of satisfaction surpasses a predefined threshold value, then the badge is tagged as approved and may be activated for display upon the publisher, via the entry interface 235, explicitly permitting impressions of the badge 260 in concurrence with specified search results.

In another instance evaluation, a coverage-weighted analysis is conducted using a blend of criteria having differing weights attached thereto. By way of example, the criteria may include one or more of the following: whether the search result under review references a top-twenty website in a particular market segment, whether the website underlying the search result has a significant click-through-rate, whether the revenue earned by the searching service (e.g., represented by the server 250) increases upon rendering the badge 260, whether the search result is associated with an authoritative publisher, and whether user satisfaction within the pool exhibits a net increase. Upon executing the coverage-weighted analysis to determine whether the badge 260 visually reinforces the authority of the search result, the search result may or may not be preauthorized to reveal the badge 260.

When the analysis concludes that the badge 260 is preauthorized, the UX layer 220 is allowed to render the badge 260 in tandem with the corresponding search result on the web-result page. Alternatively, if the badge 260 fails to be preauthorized during the fighting process, the data targeted by the template to generate the badge 260 may still be collected, however, included within the description of the search result as opposed to within the badge 260. Further, the fighting process may be reexecuted upon making incremental improvements to the initial version of the badge 260 that failed the previous fighting process.

Once the badge 260 is preauthorized for rendering, the publisher of the website associated with the badge 260 may be solicited by the publisher-portal component 230 to approve the use of the badge 260 and/or make alterations to the appearance and function of the badge 260. For instance, the publisher may alter the badge 260 by modifying or entirely replacing the configuration data with solicited data and/or extracted data. Generally, the phrase "solicited data" may generally comprise information requested of the publisher by the publisher-portal component 230, such as which logo or link to upload. By way of example, the solicited data may include a type of metadata to extract from the online documents 280, static rankings or ratings input directly by the publisher (e.g., typically matching the actual rankings or ratings that users provided the publisher's goods or services).

The "extracted data" generally involves information that the publisher has asked the badge-composer component 240 to gather in order to generate the badge 260. For instance, the publisher may indicate a type of metadata, via interaction with the entry interface 235 of the publisher-portal component 230, that is intended for extraction from one or more of the online documents 280. Upon detecting and storing the indicated type of data within the template of the badge 260, the badge-composer component 240 may crawl the online documents 280 to extract the metadata as dictated by the template. Or, the badge-composer component 240 may select the indicated metadata from a set of cached metadata previously extracted from the online documents 280. Accordingly, the extracted metadata input within the badge's graphical region may be dynamically updatable based, in part, upon changes to the online documents 280.

By way of example, the extracted metadata from the online documents 280 may include reviews, user visits, ratings, and the like. This metadata may be extracted upon a searching service crawling the online document 280 to capture and index metadata that reflects the content of the online documents 280, where the online documents 280 generally represent cached versions of web pages that are previously marked-up to expose the metadata. That is, the metadata may be detected for extraction per the HTML markup, which labels it as being specified for potential insertion into the graphical region of the badge 260. Upon being detected, the metadata may be extracted using key-value pairs, which semantically link the values or content with a predetermined type of metadata. As such, the metadata may be categorized, or strongly typed, into a scalable set of supported data types complete with labels. Once the metadata is extracted, it can be filtered (e.g., using a badge-config layer that sorts metadata based on the template) to identify and select for incorporation the extracted metadata that corresponds with the type of metadata that was indicated to appear within the badge 260.

The employment of the publisher-portal component 230 to enable publisher feedback will now be discussed. Initially, the publisher-portal component 230 provides and supports a web-accessible entry interface 235 that facilitates a partner-interaction process. Generally, the "partner-interaction process" acts to collect feedback from the publisher by prompting the publisher to submit input (e.g., upload a logo or modify parameters of the template) and to collect and apply the submitted inputs to the badge 260. As such, the partner-interaction process establishes a feedback loop that allows the publisher, or even content providers in some cases, to control and update the visual appearance and configuration of the badge 260 by altering parameters of the template, which governs a layout and elements populated into the layout of the badge 260.

In one instance, the partner-interaction process is configurable based upon the inputs the publisher has made at the entry interface 235. That is, the steps and prompts that are automatically initiated by the partner-interaction process may be dynamically tailored in accordance with the inputs that the publisher is submitting to the entry interface 235. By way of example, if the publisher has established parameters that pull metadata (extracted data) from the online documents 280, the entry interface 235 may issue a prompt for the publisher to request selection of a type of metadata. In another example, if the publisher selects various types of metadata to be selected for display from the extracted metadata, the entry interface 235 may solicit the publisher to specify a priority of the types of metadata. When a priority is specified, the metadata are assigned an ordering in which they are inserted within the allocated areas of the badge 260. In operation, upon discovering that an article of higher-priority metadata is unavailable upon attempting to render the badge 260, the specified priority is examined to identify a lower-priority metadata that can temporarily substitute for the unavailable metadata. Thus, based on the previous interactions with the publisher, the entry interface 235 is adaptable to dynamically reconfigure itself to intelligently identify the options that are offered to the publisher.

Figure 3:
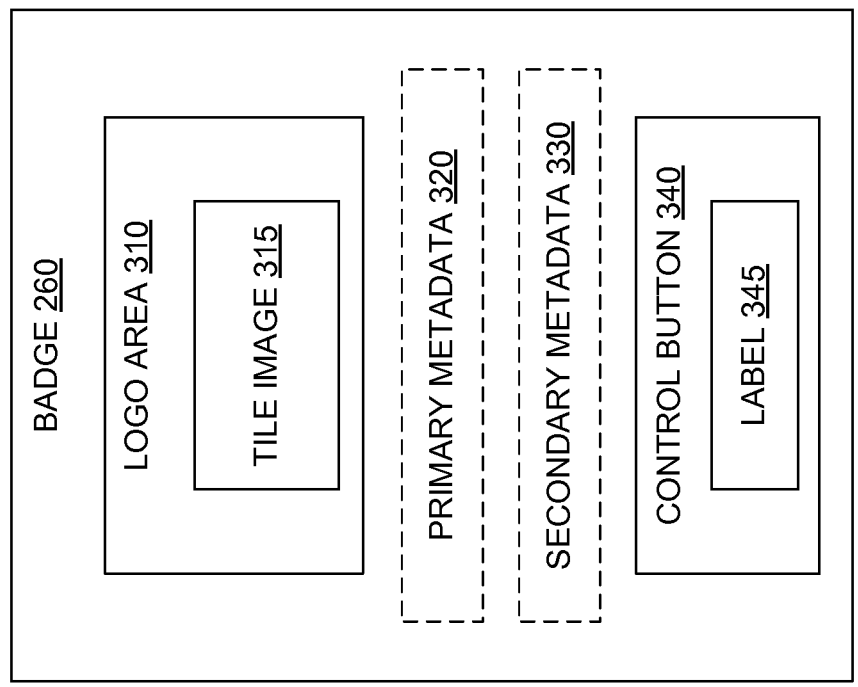
FIG. 3 is a diagrammatic badge depicting various illustrative aspects of a template, in accordance with an embodiment of the present invention.

Turning to FIG. 3, a diagrammatic badge 260 depicting various illustrative aspects of a template is shown and will now be discussed in accordance with an embodiment of the present invention. Initially, as mentioned above, the badge 260 is employed to decorate a search result that has been authorized, upon satisfactorily completing the fighting process, and approved by the publisher to be accompanied by the badge 260. Advantageously, upon presenting a user with a web-results page, the user's experience is substantially enhanced when various search results within the page are decorated with badges 260 that clearly and immediately describe or reflect key aspects of the underlying online documents at a glance (i.e., providing the user with a notion of the kind of content available upon navigating to the online document, as well as attempting to answer the question posed by the query, without clicking through to the website).

As depicted in FIG. 3, the badge 260 includes a template with various areas designated to hold visual depictions of predefined elements. For instance, the logo area 310 of the layout is designated to hold a tile image 315 of a branded element. As discussed above, the branded element may be automatically selected (e.g., configuration data) or manually uploaded by the publisher (e.g., solicited data). The areas of the layout for primary metadata 320 and secondary metadata 330 are established based upon the publisher's inputs during the partner-interaction process. In an exemplary embodiment, the number of types of metadata (e.g., extracted data), up to a predetermined limit, corresponds with the number of areas built into the layout that are designated to hold extracted metadata. As illustrated in FIG. 3, the two areas carved out for the metadata 320 and 330, respectively, indicate that the publisher prefers to expose two visual elements that are reflective of the content of the online documents referenced by the search result. Thus, the search result is decorated with metadata that the publisher determines to be important or informative.

The control button 340, if picked as an option by the publisher at the entry interface, may be placed in an area allocated for user input within the layout of the badge 260. In operation, the control button 350 is responsive to a user's selection thereon and functions to navigate the user to a link. This link (e.g., solicited data) may be provided by the publisher during the partner-integration process in response to an optional prompt that is issued when the publisher has indicated s/he desires the control button 340 to be active on the badge 260. By way of example, upon actuation by the user, the link may navigate the user to an online document underlying the search result, a related web page, an associated website, or any other online location that the publisher deems relevant to the user's understanding of the online document. Beyond selecting the link, the publisher may also be prompted to select a label 345 that expresses some indicia of the target of the link that searched upon activating the control button 345.

As shown, the logo area 310 and the other areas on the layout may be configured with fixed dimensions as dictated by the template of the badge 260. Other parameters not mentioned above, such as background color and font size, may also be configured by the publisher, which affect the overall appearance of the badge 260. Although various different examples of the data, features, and functionality that are placed within the layout of the badge 260 have been described, it should be understood and appreciated that other types of suitable images, information, and/or aesthetics that provide insight to the relevance, value, or identity of the decorated search result may be used, and that embodiments of the present invention are not limited to the exemplary visual elements described herein.

Thus, as shown in FIG. 3, the badge 260 merges branded element(s) and useful metadata to create a value-added component that offers a robust combination of information and access to information in a single elegant unit.

Turning to FIGS. 4-9, a selection of example badges are depicted for purposes of discussion. It should be noted that these exemplary badges are for demonstration only, and not intended to limit the possible configurations that are contemplated by other embodiments of the present invention. With reference to FIG. 4, a schematic diagram 400 depicting a first illustrative search result 450 that includes a representation of an exemplary badge 410 surfaced concurrently with the search result 450 is shown, in accordance with embodiments of the invention. This badge 410 includes a branded element 420 (e.g., solicited data) that holds a logo and name of the publisher's place of business. The badge 410 also includes two articles of metadata (e.g., extracted data) that correspond to marked-up metadata on the online document underlying the search result 450. As illustrated, the articles of metadata include a rating "⅗" 430 of the publisher's performance via goods or services and a number "118 Reviews" 440 that provides context for the rating. In this embodiment, the rating scale (e.g., ⅗) was selected by the publisher from a standard scale offered by the entry interface. In other embodiments, the publisher is allowed to create their own rating scale (e.g., X/9).

With reference to FIG. 5, a schematic diagram 500 depicting a second illustrative search result 550 that includes a representation of an exemplary badge 510 surfaced concurrently with the search result 550 is shown, in accordance with embodiments of the invention. This badge 510 includes a branded element 520 that holds a logo and name "Contoso" of the publisher's restaurant. The badge 510 also includes a control button 530 that is labeled "see menu." Upon activation of the control button 530, the user is automatically directed to the menu of the restaurant Contoso, thus, expeditiously fulfilling the intent (i.e., research restaurant offerings) of the user performing the search.

Figure 6:
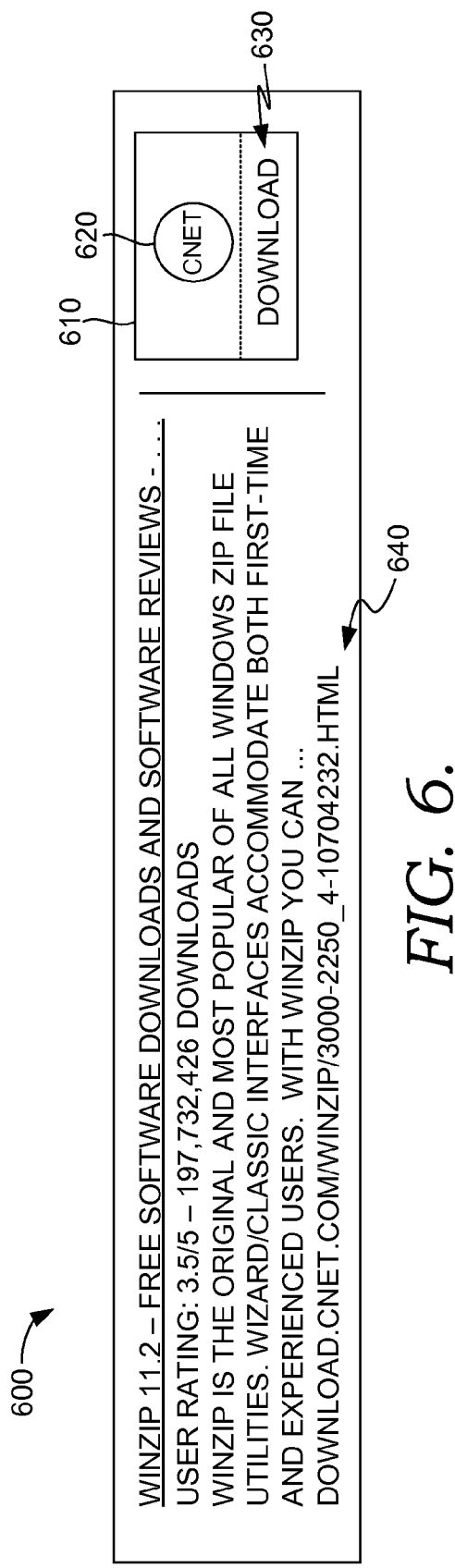
FIG. 6 is a schematic diagram depicting a third illustrative search result that includes a representation of an exemplary badge surfaced concurrently with the search result, in accordance with embodiments of the invention.

Turning now to FIG. 6, a schematic diagram 600 depicting a third illustrative search result 640 that includes a representation of an exemplary badge 610 surfaced concurrently with the search result 640 is shown, in accordance with embodiments of the invention. This badge 610 includes a branded element 620 with the trademark of "CNET" representing the publisher and a control button 630 labeled "download." In embodiments, activation of the control button 630 locates one or more online documents, files, digital media, and the like, and retrieves it for storage at the user's local computer (e.g., client device 210 of FIG. 2).

Figure 7:
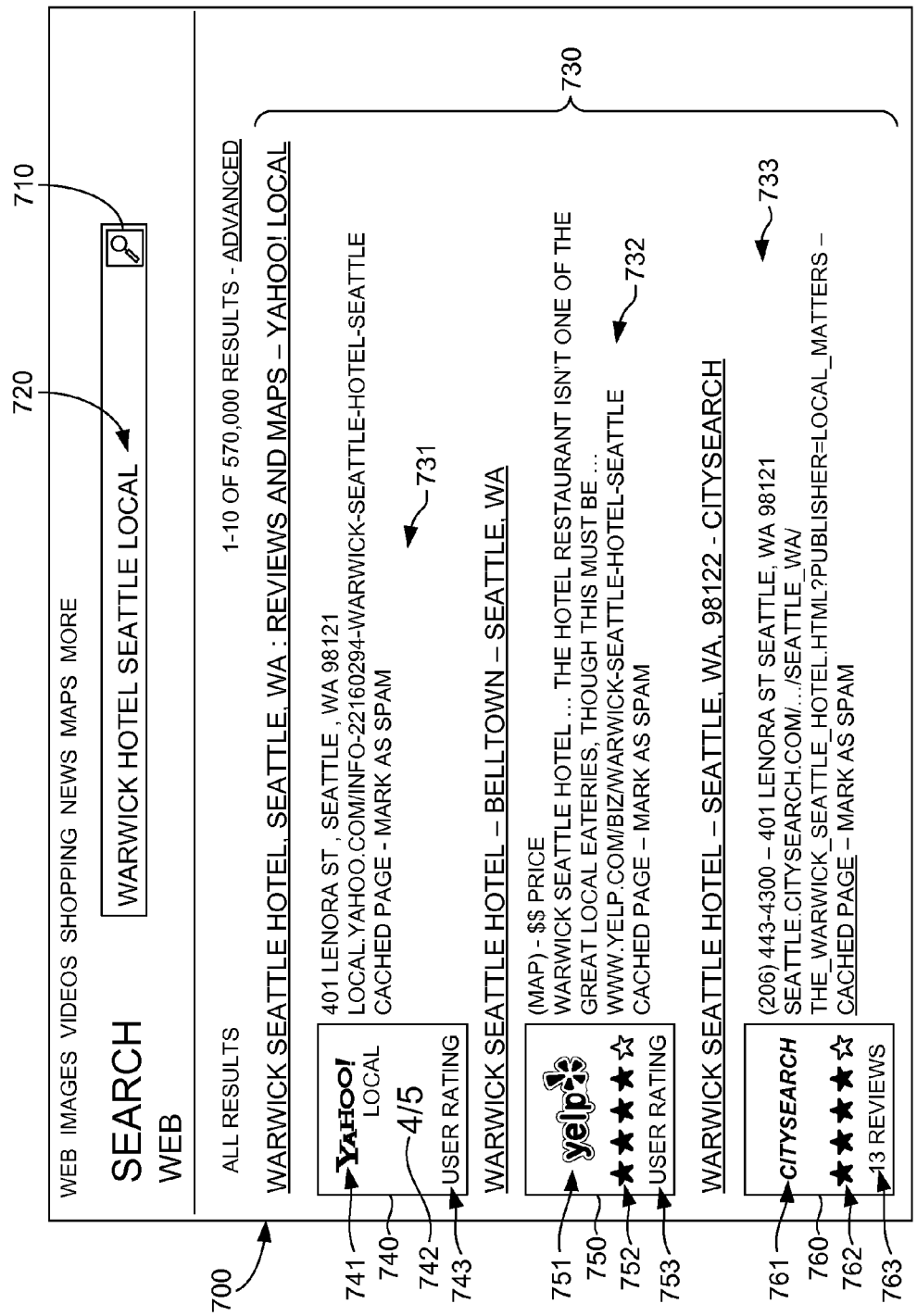
FIG. 7 is a schematic diagram depicting a first illustrative UI display that includes representations of badges surfaced in association with respective search results, in accordance with embodiments of the invention.

Referring to FIG. 7, a schematic diagram depicting a first illustrative UI display 700 that includes representations of badges 740, 750, and 760 that are surfaced in association with respective search results is shown and will be described in accordance with embodiments of the invention. Initially, a set of search results 731, 732, and 733 is generated in response to a query 720 being entered into a request box 710 of a web-browser application. As shown, each of the search results 731, 732, and 733 presented on the web-results page 730 is authorized and approved to include a badge. In addition, as shown, the appearances of the badges 740, 750, and 760 vary based on the configurations of the badge parameters previously established by the respective publishers. For instance, the badge 740 includes metadata 742 that indicates a rating "⅘" of a five-point scale, while the badge's 750 and 760 include a rating of four stars in a five-star scale.

Also, the branded elements 741, 751, and 761 of the badges 740, 750, and 760, respectively, correspond to the various logos of their respective publishers. Further, the badge 760 includes two articles of extracted metadata 762 (rating out of five stars) and (number of people reviewing the website) 763, while the badges 740 and 750 include just one article of extracted metadata 742 and 752, respectively. However, remaining space on the badges 740 and 750 is allocated for providing labels 743 and 753 (e.g., configuration data), respectively, that indicate the meaning of the metadata 742 and 752.

Figure 8:
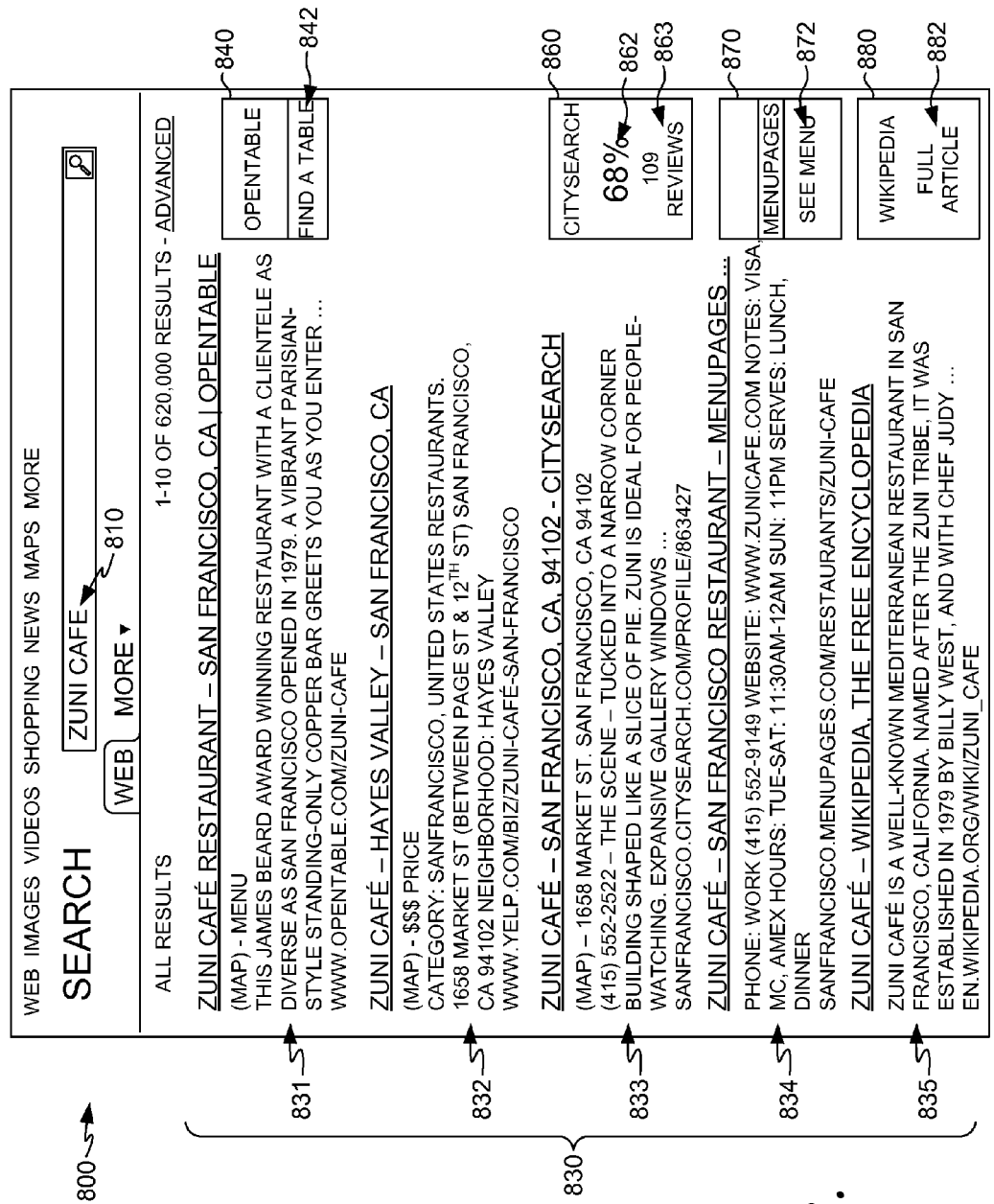
FIG. 8 is a schematic diagram depicting a second illustrative UI display that includes representations of badges surfaced in association with respective search results, in accordance with embodiments of the invention.

Turning to FIG. 8, a schematic diagram depicting a second illustrative UI display 800 that includes representations of badges 840, 860, 870, and 880 surfaced in association with respective search results 831, 833, 834, and 835 are shown, in accordance with embodiments of the invention. As depicted, the search result 832 on the web-results page 830 was either not authorized by the search service or not approved by the publisher to have a badge, while the remaining search results 831, 833, 834, and 835 were awarded badges 840, 860, 870, and 880, respectively. Similar to FIG. 7, the badges 840, 860, 870, and 880 include differing information that results in distinct graphical regions. In instances, the badge 860 includes the extracted metadata 862 (ranking of the website against comparable online locations) and 863 (number of reviews of the website that derived the ranking), while the badges 840, 860, 870, and 880 include control buttons 842, 872, and 882, respectively. However, there exists variation between the operation of these control buttons 842, 872, and 882. For example, the control button 842 navigates the user to a service the facilitates making a reservation at the restaurant "Zuni Café," which is the subject of the query 810. In another example, the control button 872 navigates the user to a menu associated with the restaurant. In yet another example, the control button 882 navigates the user to a web page that describes the restaurant. As such, the functionality of the control buttons 842, 872, and 882 can be tailored to specific navigations and/or operations that relate to the respective services of the publishers, yet still assist in satisfying the user's intent of the search.

Turning now to FIG. 9, a schematic diagram depicting a third illustrative UI display 900 that includes representations of badges 940, 950, and 960 surfaced in association with respective search results 931, 932, and 933 are shown, in accordance with embodiments of the invention. In contrast to the badges of FIG. 8, which are visually associated with the search results by being positioned in proximity therewith, the badges 940, 950, and 960 are integrated within the search results 931, 932, and 933 of the web-results page 930. Further, as discussed above, the metadata 942, 952, and 962 selected to be incorporated into the badges 940, 950, and 960 may vary based on publisher preferences.

Figure 10:
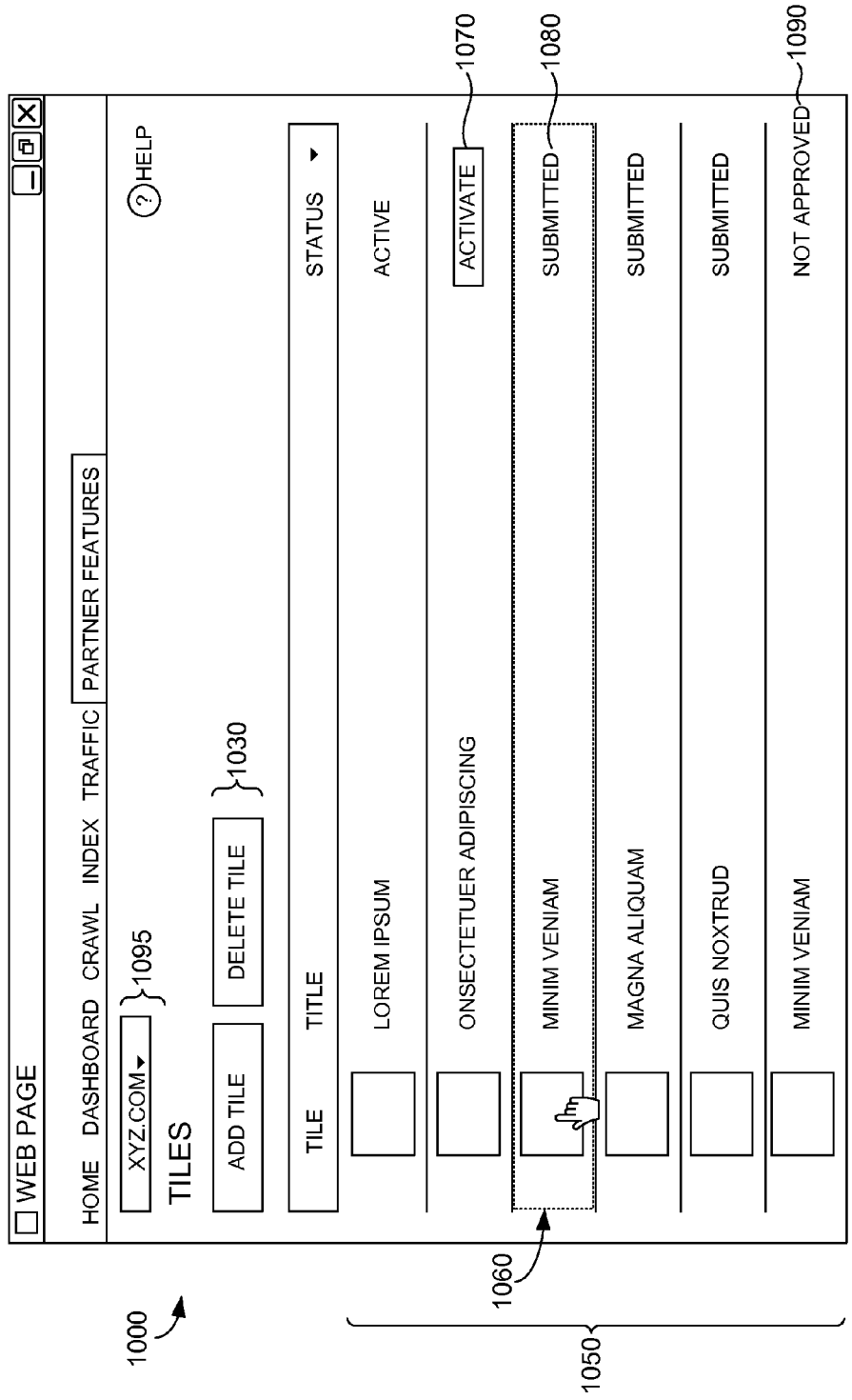
FIGS. 10-16 are schematic diagrams that represent a progression of illustrative UI displays that depict an exemplary method for interacting with a publisher portal, in accordance with embodiments of the invention.

Referring now to FIGS. 10-16, schematic diagrams that represent a progression of illustrative UI displays 1000, 1100, 1200, 1300, 1400, 1500, and 1600 that depict an exemplary method for interacting with a publisher portal are shown and will be described in accordance with embodiments of the invention. Initially, as shown in FIG. 10, the publisher is presented with a listing of badges 1050 of a particular website domain 1095 "XYZ.com" upon logging into their account on the publisher-portal component. In embodiments, logging in may include accepting a terms-of-use dialog or other legal contract provided by the entry interface. Once the publisher has accessed the account, s/he may select one or more of the badges 1050 to manipulate.

As depicted on the illustrative UI display 1000, the badges 1050 are in various stages of authorization or approval. For instance, the status submitted 1080 indicates the respective badge is entering the fighting process, while not approved 1090 indicates the respective badge has failed the fighting process. In the latter instance, the publisher may be prompted to delete the failed badge via the control 1030. Further, when a badge has passed the fighting process, the status 1070 may indicate "activate," which alerts the publisher to either approve or deny the publisher-portal component activating the authorized badge.

Figure 11:
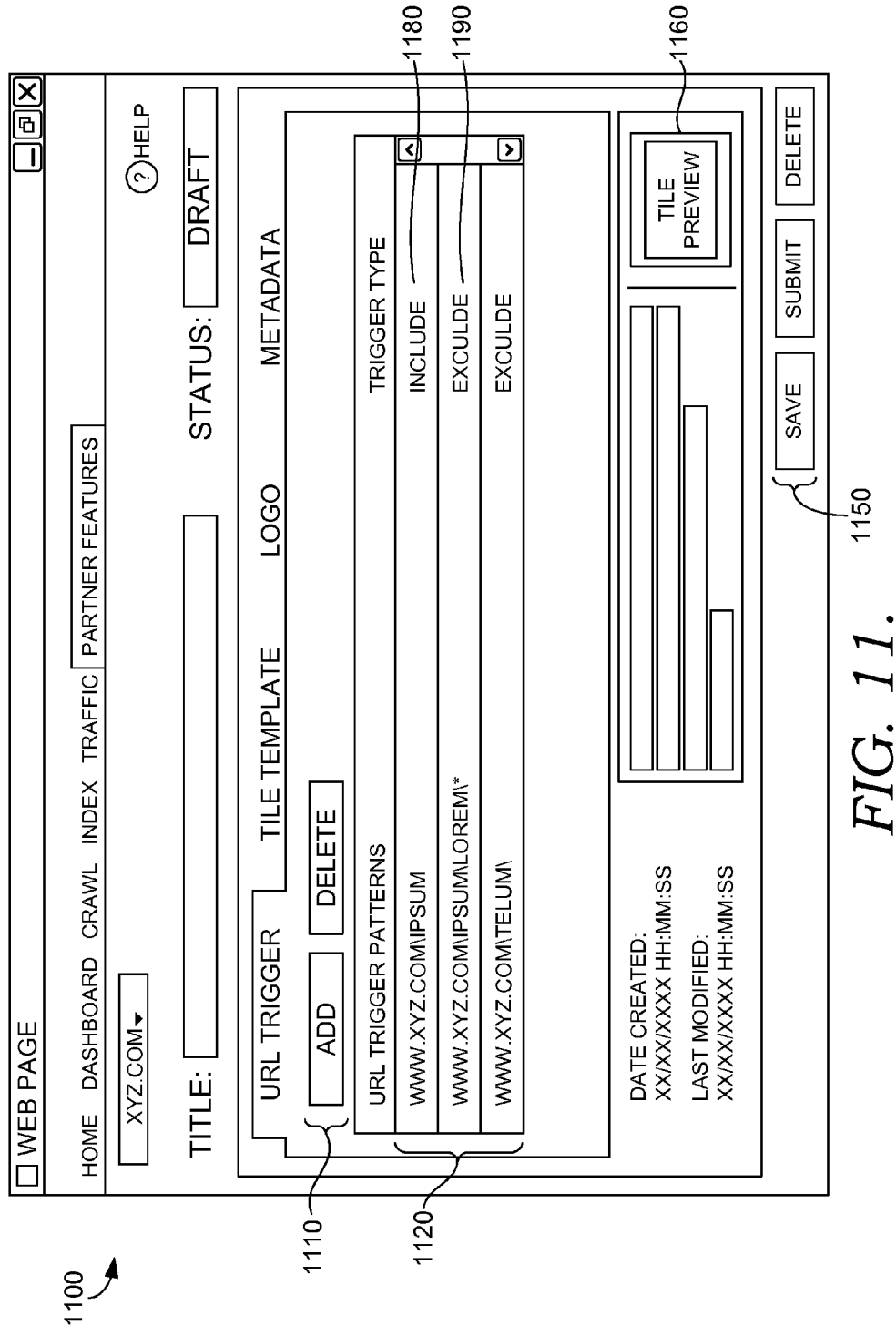

In addition, the publisher may select a badge 1060 for manipulation of the parameters and/or trigger patterns. Turning to FIG. 11, the UI display 1100 shows a tool for designating the links that, when retrieved during a search, act to trigger the badge 1060 to appear. These designated links, wherein inclusive or exclusive, are collectively referred to as the trigger pattern 1120. The controls 1110 assist the user in amending the number of links within the trigger pattern and adding additional expressions for incorporation in the trigger pattern 1120, while the controls 1150 allow the user to save or delete the trigger pattern. Within the trigger pattern, some links 1180 are assigned an inclusive trigger—meaning that the link 1180 will trigger initiating rendering of the badge associated with the trigger pattern 1120. Alternatively, other links 1190 are assigned an exclusive trigger—meaning that link 1190 will preclude rendering of the associated badge even when an inclusive trigger has been satisfied. Thus, the trigger pattern 1120 allows for a more refined target of what invokes rendering of the badge.

Figure 12:
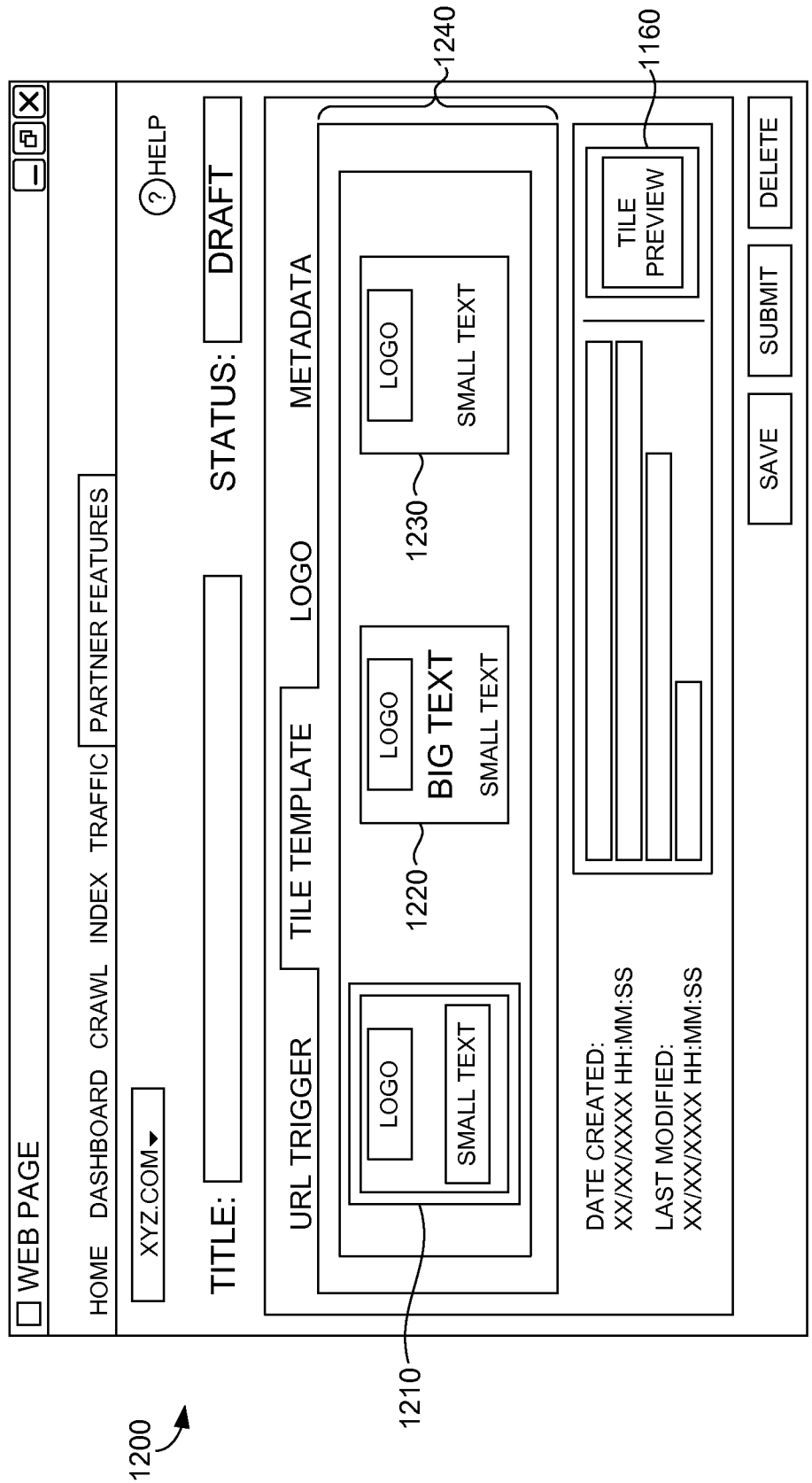

With reference to FIG. 12, a UI display 1200 for selecting a template from a listing 1240 of preformatted templates 1210, 1220, and 1230 is shown. Each of the templates 1210 ("button template" that includes a control button for navigating to a publisher-provided link or URL), 1220 ("one-element template" that is configured to hold one article of extracted metadata), and 1230 ("two-element template" that is configured to hold two articles of extracted metadata) includes a distinct layout that provides at least one area designated to accept particular information. As discussed above, the template dictates the type of metadata that is input into badge, as well as the formatting of the metadata (e.g., position, size, color, font, and the like). Further, the template governs what options are offered to the publisher when progressing through the partner-interaction process, thereby, only issuing meaningful prompts while suppressing prompts that no longer apply. Once one of the preformatted templates 1210, 1220, and 1230 is selected, it may be previewed in the display area 1160 to ensure the publisher agrees with the format.

Figure 13:
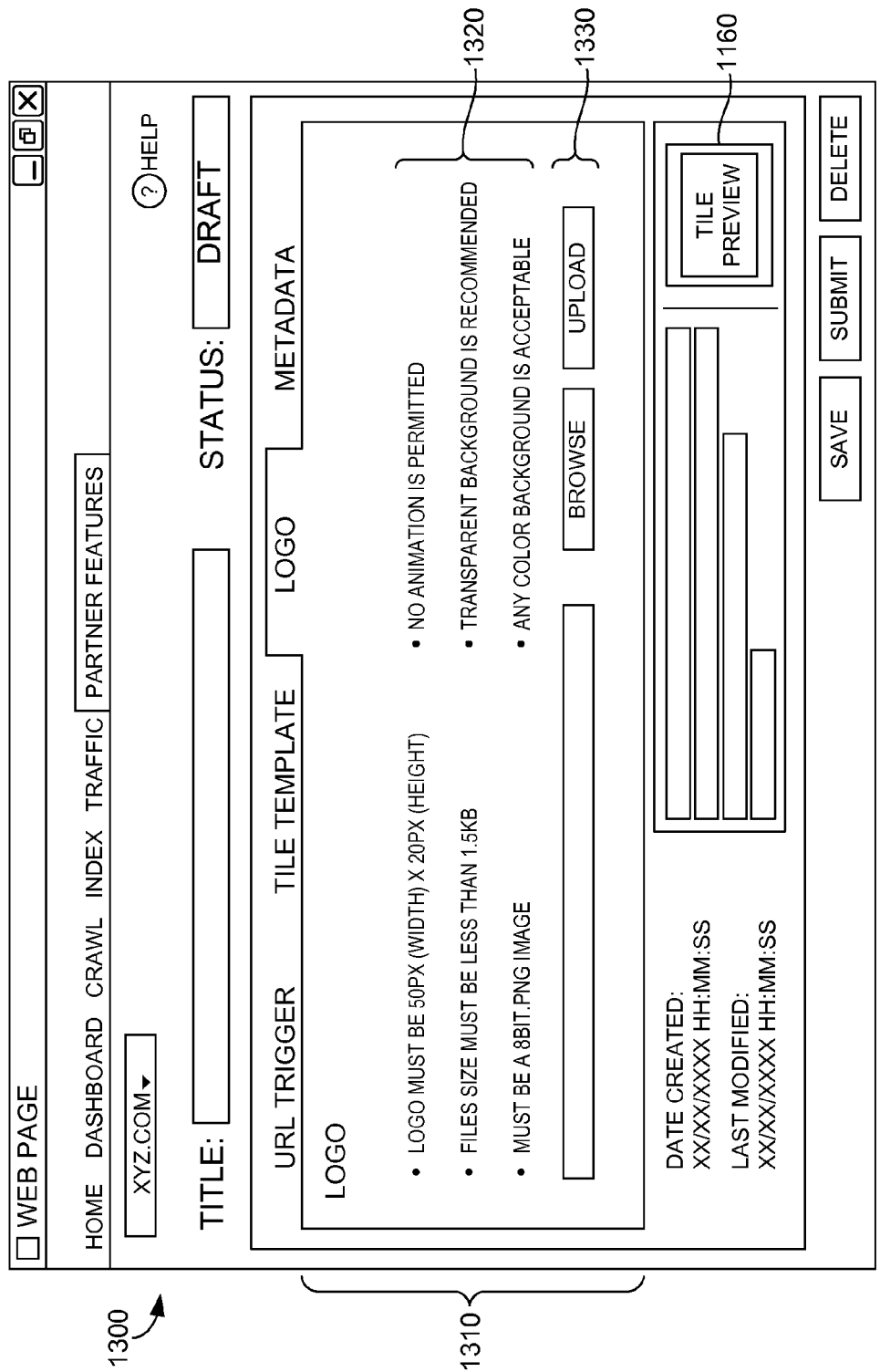

Turning now to FIG. 13, a display area 1310 is provided for the publisher to upload a logo, trademark, or other image that will be designated as the branded element. The controls 1330 allow the publisher to find and upload the branded element from a local or remote data store. In embodiments, guidelines 1320 may be surfaced that instruct the publisher on how to properly select and upload the branded element, such that the finished badge passes inspection by the UX layer. Once the branded element is uploaded, the publisher is provided the opportunity to review the appearance of the in-progress badge at the display area 1160.

Figure 14:
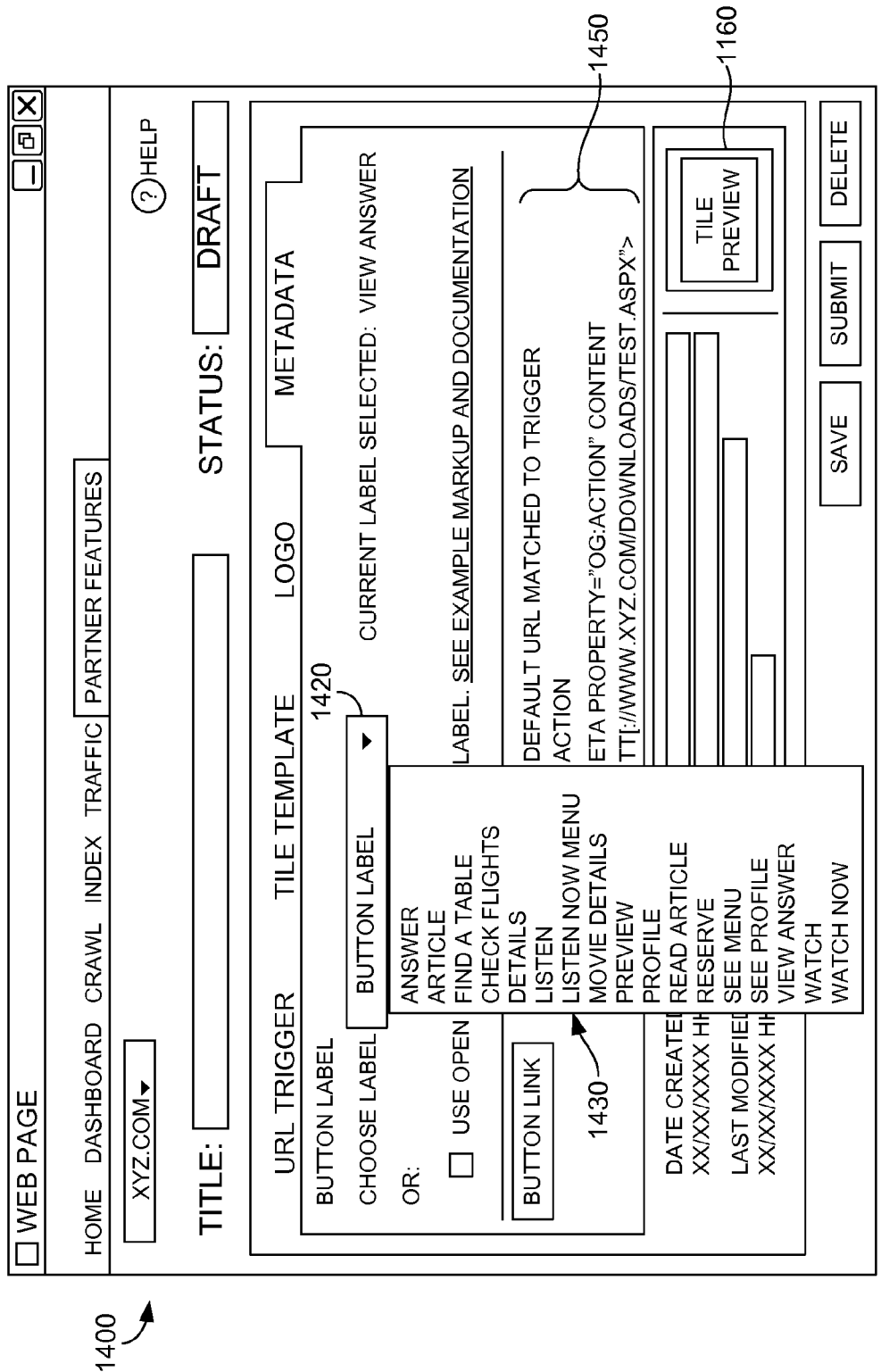

The UI display 1400 of FIG. 14 shows a tool within the entry interface for customizing a control button, for example, if template 1210 of FIG. 12 was selected from the listing 1240. In one instance, the publisher is prompted to indentify an appropriate label for the control button using the drop-down menu 1420 of UX-layer approved labels 1430, or any other mechanism for offering selection of labels. In another instance, the publisher is prompted to provide and/or select a link (e.g., URI or URL) that is searched upon the user actuating the control button. The selected link is revealed in the display area 1450 for publisher review. As mentioned above, this link may navigate to the same online document referenced by the search results, or the link may alternatively point to another online destination that is preferred by the publisher.

Figure 15:
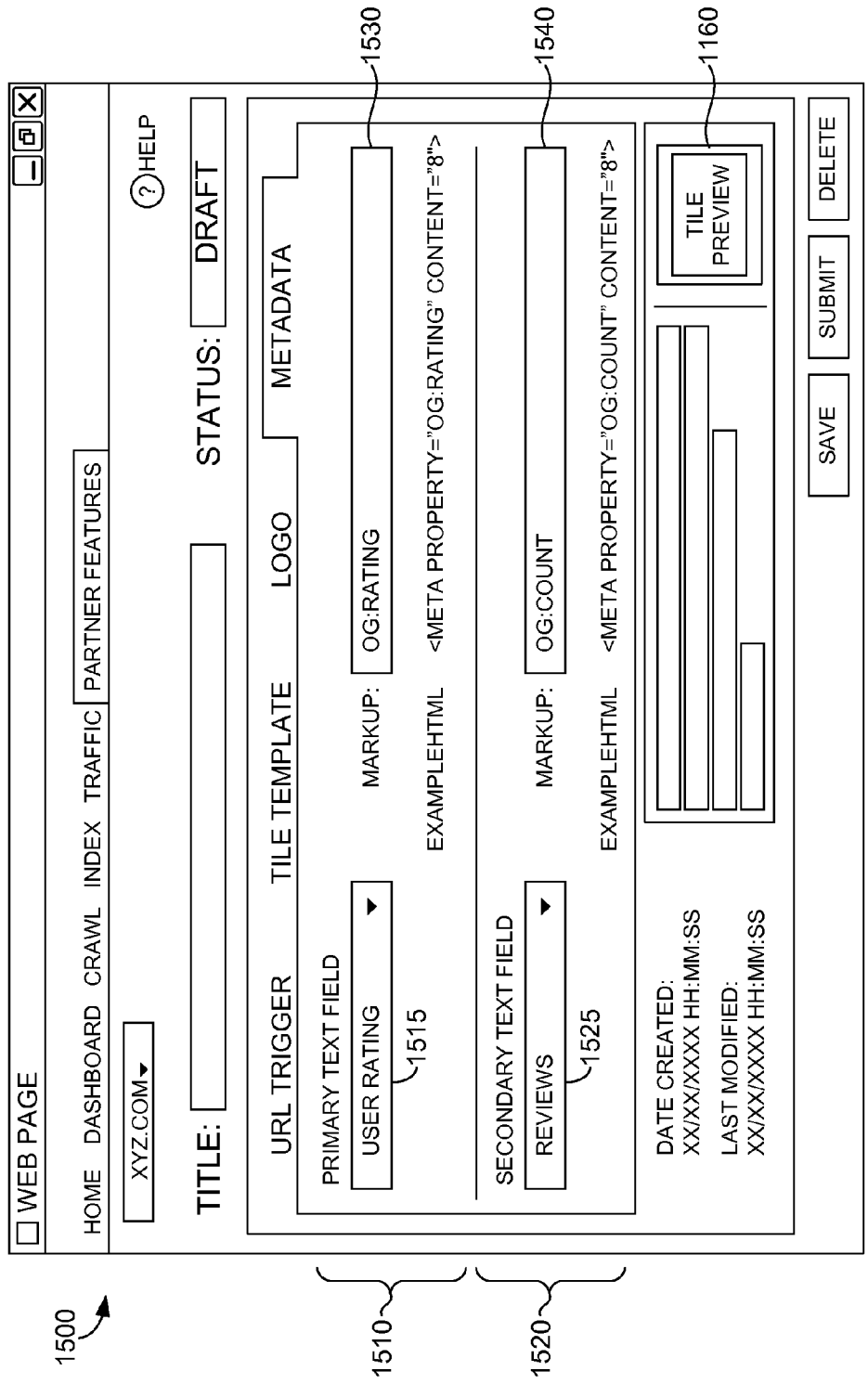

The UI display 1500 of FIG. 15 shows a tool within the entry interface for customizing a pair of extracted metadata, for example, if template 1220 of FIG. 12 was selected from the listing 1240. In one instance, the publisher is prompted to indentify an appropriate label for the primary metadata using the drop-down menu 1515, or any other mechanism for offering selection of labels. Also, the publisher is prompted to select the type of the primary metadata to be selected from the extracted data for inclusion within the badge via the drop-down menu 1530. In another instance, the publisher is prompted to indentify an appropriate label for the secondary metadata using the drop-down menu 1525, or any other mechanism for offering selection of labels. Also, the publisher is prompted to select the type of secondary metadata to be selected from the extracted data for inclusion within the badge via the drop-down menu 1540. It should be noted that by selecting one type of metadata in the display area 1510 (primary) it is inherently designated a higher level of priority than the type of metadata selected in the display area 1520 (secondary).

Figure 16:
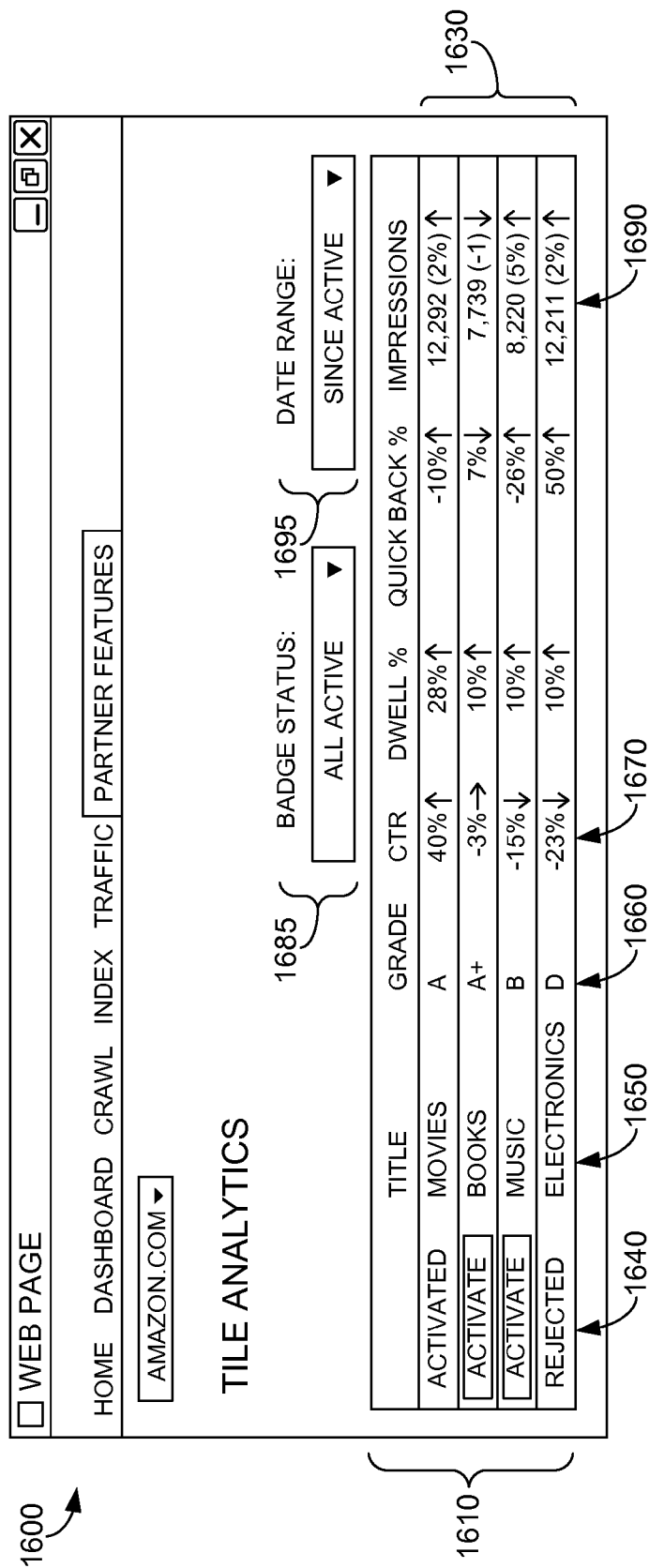

With reference to FIG. 16, the UI display 1600 provides the publisher with a dashboard 1610 to monitor the performance of various badges 1630 in parallel. The controls 1685 (filter by status) and 1695 (filter by activation date or age) allows the publisher to manipulate the criteria that governs which badges 1630 are being shown concurrently. The dashboard 1610 includes a header that indicates what characteristics of the badges 1630 are presently being tracked. Some exemplary characteristics include the status 1640, the title 1650, the grade 1660 automatically awarded by the publisher-portal component based on the badges' performance, the click-through-rate 1670 measured by the search service, and the number of impressions 1690 of the badges since inception. It should be appreciated and understood that any quantity and quality of characteristics may be tracked and presented within the dashboard 1610, and that the characteristics 1640, 1650, 1660, 1670, and 1690 shown are not meant to be limiting.

Figure 17:
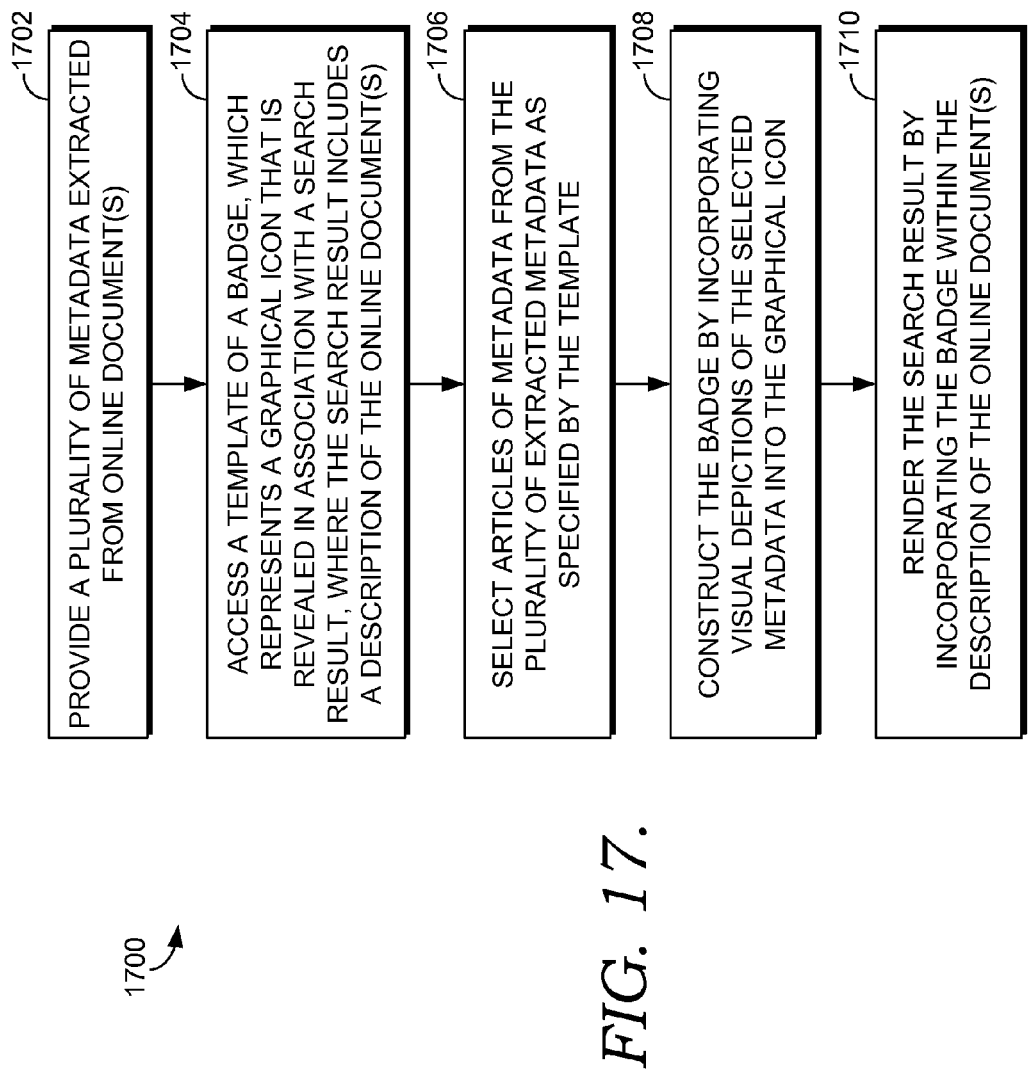
FIG. 17 is a flow diagram illustrating an overall method for formatting a badge according to a template, in accordance with an embodiment of the present invention.

Turning now to FIG. 17, a flow diagram illustrating an overall method 1700 for formatting a badge according to a template is shown, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, as more fully described above, the badge is associated with at least one search result selected for rendering on a GUI display. In embodiments, the method 1700 involves providing a plurality of metadata extracted from one or more online documents, as depicted at block 1702. In addition, as depicted at block 1704, a template that is previously assigned to the badge is accessed. Typically, the badge represents a graphical region or tile image that is revealed in association with a search result, while the search result includes a brief description of or reference to the online document(s).

The method 1700 may further involve the steps of selecting one or more metadata from the plurality of extracted metadata as specified by the template (see block 1706) and constructing the badge by incorporating the selected metadata into the badge (see block 1708). In an exemplary embodiment, the step of incorporating comprises inserting visual depictions of the selected metadata, as well as other data (e.g., branded element, control button, label, and the like), within the graphical region of the badge. When displaying the web-results page, as depicted at block 1710, the search result may be rendered within the GUI by incorporating the badge within its description of the online document(s) that are referenced by the search result. In instances, the step of incorporating involves integrating the badge within the search-result description or arranging the badge in proximity with the search result such that they are visually associated with one another.

Figure 18:
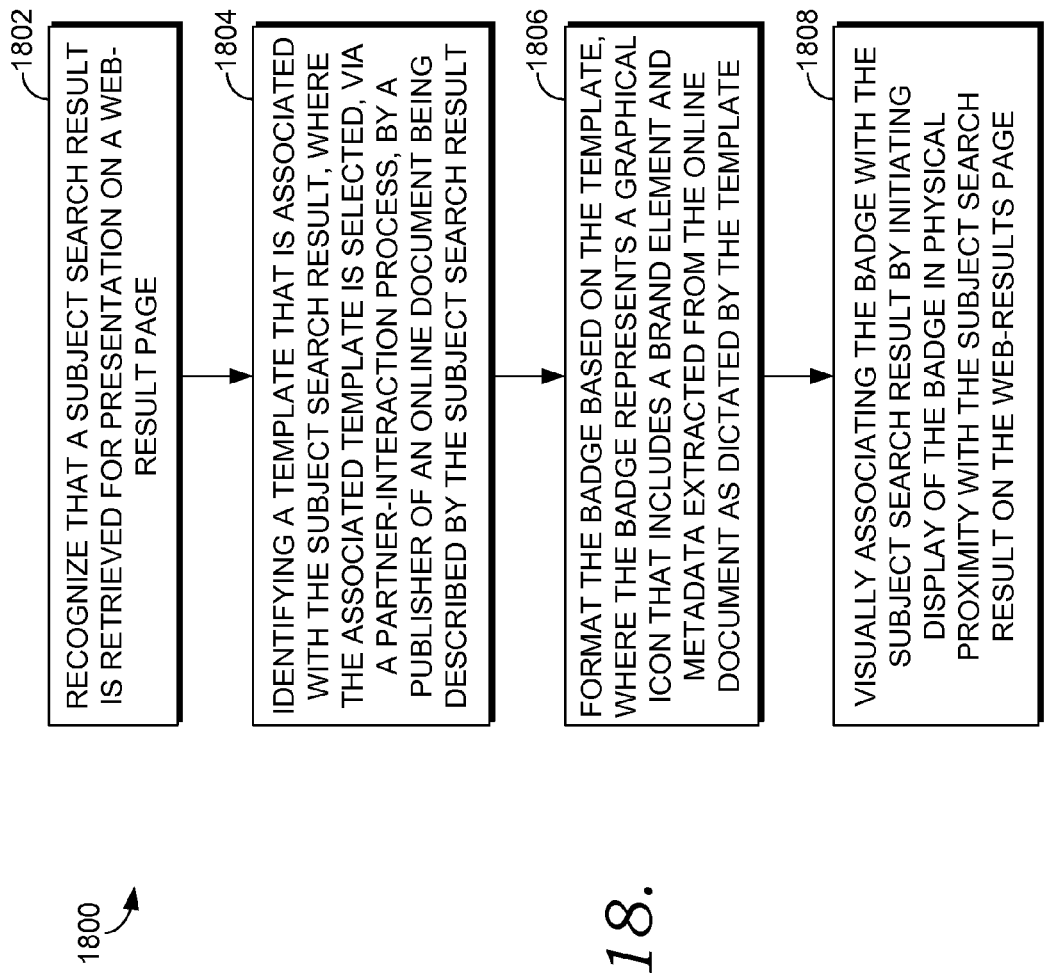
FIG. 18 is a flow diagram illustrating an overall method for focusing a user's attention on a subject search result by rendering a badge therein, in accordance with an embodiment of the present invention.

Turning now to FIG. 18, a flow diagram illustrating an overall method 1800 for focusing a user's attention on a subject search result by rendering a badge therein or therewith is shown, in accordance with an embodiment of the present invention. In embodiments, the method 1800 includes the steps of recognizing that the subject search result is retrieved for presentation on a web-result page (see block 1802) and identifying a template that is associated with the subject search result (see block 1804). Typically, the associated template is selected, via a partner-interaction process, by a publisher of an online document. Often, the online document is the web page or website that is being referenced by the subject search result.

The method 1800 may further involve formatting the badge based on the template, as depicted at block 1806. Generally, the badge represents a graphical region that includes a brand element and/or metadata extracted from the online document as dictated by the template. When rendering the web-results page, the badge may be visually associated with the subject search result by initiating a display of the badge in physical proximity with the subject search result, as depicted at block 1808. Further, upon viewing the badge, the publisher may invoke the partner-interaction process to alter the appearance of the badge, as more fully discussed above.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage memory devices having a badge formatting and surfacing system embodied thereon including computer-executable instructions that, when executed, perform a method for formatting a badge according to a template selected by a publisher, wherein the badge is associated with at least one search result selected for display on a graphical user interface (GUI), the method comprising:
providing a plurality of metadata extracted from one or more online documents;
accessing the template that is previously assigned to the badge, wherein the badge represents a graphical region that is revealed in association with the at least one search result, and wherein the at least one search result includes a description of the one or more online documents;
determining whether the at least one search result is authorized for inclusion on the badge as a function of a coverage-weighted analysis that considers at least one criterion, wherein the at least one criterion considered by the coverage-weighted analysis includes at least one of revenue accrued via the at least one search result, a click-through-rate of the at least one search result, an identity of a publisher of the at least one search result, or a ranking of the one or more online documents underlying the at least one search result, and wherein the at least one criterion is employed as one of a plurality of weighting factors for authorizing inclusion of the badge;
selecting one or more metadata fitting a type of metadata indicated by the publisher from the plurality of extracted metadata;
constructing the badge by incorporating visual depictions of the one or more selected metadata into the graphical region; and
rendering the at least one search result within the GUI by incorporating the badge within the description of the one or more online documents.

2. The one or more computer-storage memory devices of claim 1, wherein the template is employed to govern a format of the badge.

3. The one or more computer-storage memory devices of claim 2, wherein the format of the badge includes at least one of configuration data, extracted data, or solicited data.

4. The one or more computer-storage memory devices of claim 3, wherein the configuration data represents static information maintained in a data store that is distinct from the extracted data, and wherein the configuration data includes at least one of a logo, labels, background colors, or dimensions of particular aspects of the badge.

5. The one or more computer-storage memory devices of claim 3, wherein the extracted data represents the plurality of metadata extracted from one or more online documents.

6. The one or more computer-storage memory devices of claim 3, wherein the solicited data represents data input directly from the publisher of the one or more online documents, wherein the solicited data represents at least one of rankings or ratings of goods or services offered at the at least one search result.

7. A computerized method, carried out by a processing unit, for focusing a user's attention on a subject search result by rendering a badge therein, the method comprising:
recognizing that the subject search result is retrieved for presentation on a web-result page;
identifying a template that is associated with the subject search result, wherein the associated template is selected, via a partner-interaction process, by a publisher of an online document being referenced by the subject search result;
prompting the publisher to indicate a type of metadata to be populated into the layout of the template, wherein the metadata represents a description of contents of the online document;
upon receiving the publisher's indication of the metadata, retrieving the indicated metadata;
formatting the badge based on the template, wherein the badge represents a graphical region that includes a brand element and the metadata retrieved from the online document as dictated by the template;
prompting the publisher to input the branded element to be populated into the layout of the template, wherein the branded element represents a publically recognizable logo of the publisher;
upon receiving the publisher's input of the branded element, maintaining an association between the branded element and the badge: and
visually associating the badge with the subject search result by initiating a display of the badge in physical proximity with the subject search result on the web-results page.

8. A computerized method, carried out by a processing unit, for focusing a user's attention on a subject search result by rendering a badge therein, the method comprising:
recognizing that the subject search result is retrieved for presentation on a web-result page;
identifying a template that is associated with the subject search result, wherein the associated template is selected, via a partner-interaction process, by a publisher of an online document being referenced by the subject search result, wherein the partner-interaction process further comprises: requesting the publisher to upload a link that is relevant to the subject search result; and requesting the publisher to label a control button that, when actuated by a user, navigates the user via the uploaded link;

prompting the publisher to indicate a type of metadata to be populated into the layout of the template, wherein the metadata represents a description of contents of the online document;

upon receiving the publisher's indication of the metadata, retrieving the indicated metadata;

formatting the badge based on the template, wherein the badge represents a graphical region that includes a brand element and the metadata retrieved from the online document as dictated by the template; and visually associating the badge with the subject search result by initiating a display of the badge in physical proximity with the subject search result on the web-results page.

9. The method of claim 8, wherein the partner-interaction process comprises:

prompting the publisher to select the template from a list of candidate templates that are preconfigured with respective layouts to accept the brand element and extracted metadata; and upon detecting the publisher's selection of the template, designating the selected template as dictating the format of the badge.

10. The method of claim 9, wherein the partner-interaction process further comprises:

prompting the publisher to select a web address of the online location; and upon detecting the publisher's selection of the web address, associating the subject search result that references the web address with the badge.

11. The method of claim 8, wherein the online document represents a cached version of at least one web page associated with the selected web address, wherein the online document is marked up to expose the metadata that is extractable for population within the layout of the badge.

12. The method of claim 8, wherein the link, the type of metadata, and the branded element represent solicited data that serves to replace configuration data, wherein configuration data is initially populated into the layout of the badge automatically.

13. The method of claim 12, wherein metadata drawn based on the type of metadata indicated by the publisher is dynamically updatable in parallel with changes to the metadata extracted from the online document.

* * * * *